United States Patent
Woodcock et al.

(10) Patent No.: US 7,531,048 B2
(45) Date of Patent: May 12, 2009

(54) ON-WING COMBUSTOR CLEANING USING DIRECT INSERTION NOZZLE, WASH AGENT, AND PROCEDURE

(75) Inventors: Gregory O. Woodcock, Mesa, AZ (US); Robert W. Mahar, Gilbert, AZ (US); William Tesch, Mesa, AZ (US); Richard A. Bonvouloir, Phoenix, AZ (US); John C. Saunders, Fountain Hills, AZ (US); Udo Schuelke, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 587 days.

(21) Appl. No.: 11/053,492

(22) Filed: Feb. 7, 2005

(65) Prior Publication Data
US 2009/0084411 A1    Apr. 2, 2009

Related U.S. Application Data

(60) Provisional application No. 60/619,981, filed on Oct. 19, 2004.

(51) Int. Cl.
*B08B 3/04* (2006.01)
(52) U.S. Cl. .............................. 134/34; 134/10; 134/20; 134/22.1; 134/22.12; 134/22.14; 134/22.18; 134/22.19; 134/24; 134/39; 134/41; 134/42; 134/169 A; 123/198 A
(58) Field of Classification Search ............. 134/10, 134/22.1, 22.12, 22.14, 22.18, 22.19, 24, 134/41, 20, 34, 36, 39, 42, 169 A; 123/198 A
See application file for complete search history.

(56) References Cited

U.S. PATENT DOCUMENTS

| 1,903,016 | A | * | 3/1933 | Thomas ................. 134/169 R |
| 2,913,875 | A | * | 11/1959 | Gray et al. ............... 60/39.825 |
| 4,051,805 | A | * | 10/1977 | Waldrum ..................... 118/58 |
| 5,011,540 | A | | 4/1991 | McDermott |
| 5,018,320 | A | * | 5/1991 | Anguelo et al. ............... 451/82 |
| 5,090,205 | A | | 2/1992 | Foster |
| 5,107,873 | A | | 4/1992 | Clinger |
| 5,388,601 | A | * | 2/1995 | Mansur .................... 134/56 R |
| 5,415,190 | A | * | 5/1995 | Ionescu ..................... 134/95.2 |
| 5,679,174 | A | * | 10/1997 | Buongiorno ............. 134/22.18 |
| 6,310,022 | B1 | | 10/2001 | Amiran |

(Continued)

FOREIGN PATENT DOCUMENTS

JP    407034846 A    2/1995

(Continued)

*Primary Examiner*—Sharidan Carrillo
(74) *Attorney, Agent, or Firm*—Ingrassia Fisher & Lorenz, P.C.

(57) ABSTRACT

A cleaning method for a combustor comprises positioning a spray portion of a nozzle through an igniter plug boss and spraying an acid solution inside the combustion chamber. The acid solution impinges the inner liner and the outer liner, dissolving contaminant deposits inside the effusion holes. The nozzle can have a second spray portion outside the combustion chamber to provide acid solution to the radially outward surface of the outer liner. After cleaning, distilled water is sprayed through the nozzle to remove the acid solution residue from the combustor. The used acid solution and distilled water can be collected, filtered and pumped through the nozzle to provide a recirculating cleaning/rinsing system.

27 Claims, 15 Drawing Sheets

U.S. PATENT DOCUMENTS

| | | | |
|---|---|---|---|
| 6,491,048 B1 * | 12/2002 | Foster | 134/169 A |
| 6,630,198 B2 | 10/2003 | Ackerman et al. | |
| 2001/0004835 A1 * | 6/2001 | Alkabie et al. | 60/757 |
| 2002/0103093 A1 | 8/2002 | LaGraff et al. | |
| 2004/0016445 A1 | 1/2004 | Koch et al. | |
| 2004/0163678 A1 | 8/2004 | Ogden et al. | |
| 2004/0195380 A1 | 10/2004 | Wall et al. | |
| 2004/0255422 A1 * | 12/2004 | Reback et al. | 15/246 |
| 2006/0288704 A1 * | 12/2006 | McCaffrey et al. | 60/772 |

FOREIGN PATENT DOCUMENTS

| | | |
|---|---|---|
| JP | 2000213737 A | 8/2000 |
| JP | 2001200767 A | 7/2001 |
| JP | 2001214755 A | 8/2001 |

* cited by examiner

| Cleaner Volume | Soak Duration | Engine Starts (end-start = 1, partial = 2, Multi = 3) | Change in Flow Blockage | Residual Blockage | Combustor |
|---|---|---|---|---|---|
| 12 | 120 | 1 | 0.6003 | 0.1376 | P110 |
| 36 | 120 | 3 | 0.7114 | 0.0507 | P169C |
| 12 | 360 | 3 | 0.6083 | 0.0632 | P160C |
| 36 | 360 | 1 | 0.5140 | 0.0334 | P114 |
| 24 | 240 | 2 | 0.7308 | 0.0839 | P162 |
| | | Confirmation Test Result (with no intermediate starts) | | | |
| 36 | 120 | 1 | 0.602464 | 0.231603 | P116 |

FIG. 13

ON-WING COMBUSTOR CLEANING USING DIRECT INSERTION NOZZLE, WASH AGENT, AND PROCEDURE

CROSS-REFERENCE TO RELATED APPLICATION

This application claims the benefit of U.S. Provisional Application Ser. No. 60/619,981, which was filed on Oct. 19, 2004, and is incorporated herein by reference.

BACKGROUND OF THE INVENTION

The present invention generally relates to methods and apparatus for cleaning components, more particularly, to methods and apparatus for cleaning gas turbine combustors.

A combustor is an important component of a gas turbine engine. Combustors comprise a combustion chamber defined by one or more combustor liners and a combustor dome. One of the more common combustor configuration types used in gas turbine engines, such as auxiliary power units (APU), is an annular combustor. An inner liner, an outer liner and a dome define the combustion chamber of an annular combustor. A mixture of fuel and air is introduced into the combustion chamber where it is ignited to produce combustion gases for a downstream turbine.

Because combustors are exposed to the temperatures generated by hot combustion gases (commonly in excess of 3500° F.) and the materials used in combustor construction are limited to about 1700-1800° F., cooling must be provided to the combustor components. A widely used technique for protecting combustor liners from hot combustion gases involves covering the combustor liners with a matrix of small holes, usually about 0.015 to 0.030 inches in diameter (effusion holes). A supply of cooling air is passed through the effusion holes to cool the liners and to add airflow to the combustion gases.

During the normal operation of the gas turbine engine, environmental contaminants can accumulate on the surfaces of the combustor, reducing engine efficiency. Additionally, contaminants can gather in the effusion cooling holes, the subsequent effusion hole plugging restricts airflow into the combustor, reducing the lean blowout margin until the gas turbine engine has little or no margin, resulting in uncommanded shutdowns of the gas turbine engine. Contaminant deposits in the effusion holes can also reduce liner cooling efficiency. Methods for removing contaminant deposits from engine components have been described.

Solid particle abrasives comprising nutshells, coke, molybdenum and/or graphite particles have been used to clean components. In these methods, the particles impinge on the surfaces of the component to dislodge deposit buildup. These techniques have been useful in removing deposits in some applications. Unfortunately, the abrasive particles can damage the base alloy and may become lodged in cracks or effusion holes during the cleaning process. Additionally, some engine components include internal passageways, such as effusion holes, which may not be sufficiently cleaned using these methods.

A component cleaning process that does not require the use of abrasive particles is disclosed in U.S. Patent Application No. 2002/0103093. In the described method, an engine component is immersed in an acid solution bath. The bath is agitated to aid in component cleaning. Although this method may remove contaminant buildup from effusion holes, it requires the component to be removed from the engine and immersed in the solution. For some applications, component removal is a time consuming and costly process.

Another cleaning process is disclosed in Japanese Patent Publication No. 2001214755. In the disclosed method, a nozzle is mounted to the combustor plenum and used to spray a cleaning fluid onto the outer surface of a combustor liner. Although this method may be useful for cleaning some combustors, it may not be suitable for cleaning all combustor configuration types. For example, the described method may not provide sufficient cleaning to the inner liner of an annular combustor because the cleaning fluid may not adequately contact the surfaces of the inner liner.

As can be seen, there is a need for improved component cleaning methods. Further, a cleaning method is needed that does not require the use of abrasive particles or the removal of the component. A method of removing contaminant deposits from combustor effusion holes is needed that does not require combustor removal.

SUMMARY OF THE INVENTION

In one aspect of the present invention, a method of cleaning a component comprises a step of spraying a fluid through at least one nozzle assembly and towards at least one surface of the component, the nozzle assembly held in position relative to the component by an adapter portion of the nozzle assembly.

In another aspect of the present invention, a method of cleaning a component having an interior surface and an exterior surface comprises a step of spraying a cleaning fluid through at least one nozzle assembly such that a first portion of the cleaning fluid passes through a first spray portion of the nozzle assembly and towards the interior surface and a second portion of the cleaning fluid passes through a second spray portion of the nozzle assembly and towards the exterior surface.

In still another aspect of the present invention, a method of cleaning a combustor having at least one igniter plug boss comprises the steps of inserting a spray portion of a nozzle assembly through the igniter plug boss; and pumping a cleaning flow through the nozzle assembly such that at least one fluid stream impinges an interior surface of the combustor.

In yet another aspect of the present invention, a method of cleaning an annular combustor comprises a step of pumping an acid solution through at least one nozzle assembly such that a first portion of the acid solution passes through a first rotating spray head of the nozzle assembly and towards an interior surface of the annular combustor and a second portion of the acid solution passes through a second rotating spray head of the nozzle assembly and towards an exterior surface of the annular combustor.

In another aspect of the present invention, a method of removing a contaminant deposit from an effusion hole of a combustor comprises the steps of pumping a recirculating flow through at least one nozzle assembly, the recirculating flow comprising between about 3% and about 5% acetic acid, the nozzle assembly having a first rotating spray head, a second rotating spray head and an adapter portion, wherein a first portion of the recirculating flow passes through the first rotating spray head and impinges an interior surface of the combustor and a second portion of the recirculating flow passes through the second rotating spray head and impinges an exterior surface of the combustor, the pumping capable of removing the contaminant deposit; and pumping a rinse flow comprising distilled water through the nozzle assembly.

In a further aspect of the present invention, an apparatus for a cleaning a combustor comprises a first spray portion capable of being inserted through an opening of the combustor, the first spray portion capable of providing at least one fluid stream to an inner liner of the combustor; and an adapter portion in contact with the spray portion and capable of holding the apparatus in position relative to the combustor.

These and other features, aspects and advantages of the present invention will become better understood with reference to the following drawings, description and claims.

BRIEF DESCRIPTION OF THE DRAWINGS

FIG. 5b is an exploded view of FIG. 5a;

FIG. 12b is a close-up view of FIG. 12a;

FIG. 13 is a table depicting flow data with respect to total cleaner volume and total soak time according to one embodiment of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides apparatus and methods for cleaning components, such as combustors, and methods for producing the same. The cleaning apparatus and methods according to the present invention may find beneficial use in many industries including aerospace, automotive, and electricity generation. The present invention may be beneficial in applications including maintenance and repair of engine components. This invention may be useful in any component cleaning application.

In one embodiment, the present invention provides a method for cleaning a component, such as a combustor. The method may comprise positioning at least one nozzle such that a cleaning fluid passed through the nozzle can impinge an interior surface of the combustor. This is unlike the prior art that positions a nozzle such that a cleaning fluid passed through the nozzle impinges the exterior surface of the combustor only. Because the prior art sprays the cleaning fluid only on the exterior surface of an annular combustor, the cleaning fluid impinges only the radially outward surface of the outer liner, resulting in insufficient cleaning of the inner liner. Unlike the prior art, the cleaning fluid of the present invention can impinge the radially outward surface of the inner liner of an annular combustor to provide inner liner cleaning.

Figure 1:
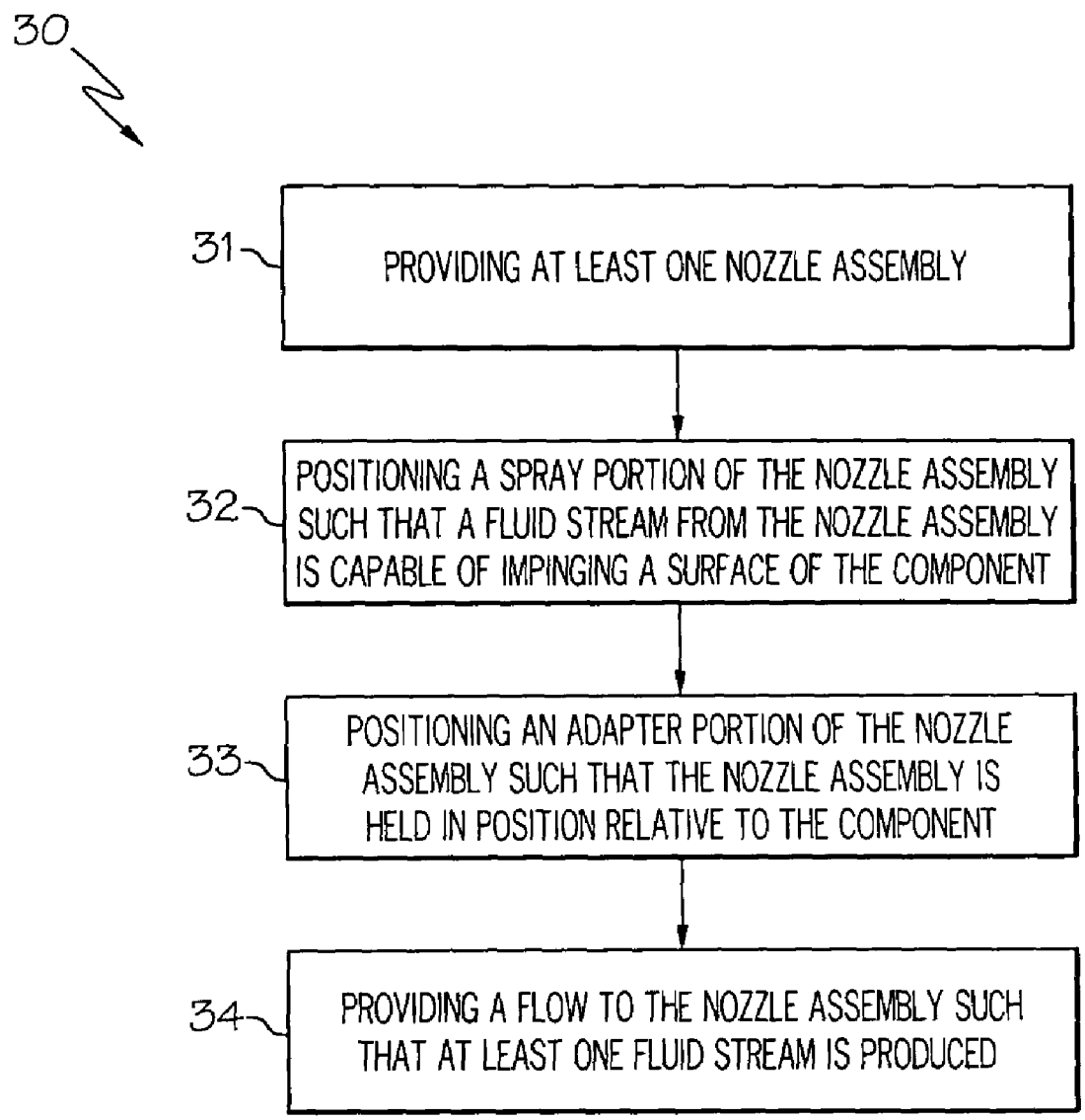
FIG. 1 is a flow chart of a method of cleaning a component according to an embodiment of the present invention.

A method 30 of cleaning a component according to an embodiment of the present invention is shown in FIG. 1. The method 30 may comprise a step 31 of providing at least one nozzle assembly, a step 32 of positioning a spray portion of the nozzle assembly such that at least one fluid stream from the nozzle assembly is capable of impinging a surface of the component, a step 33 of positioning an adapter portion of the nozzle assembly such that the nozzle assembly is held in position relative to the component, and a step 34 of providing a flow to the nozzle assembly such that at least one fluid stream is produced.

Figure 2:
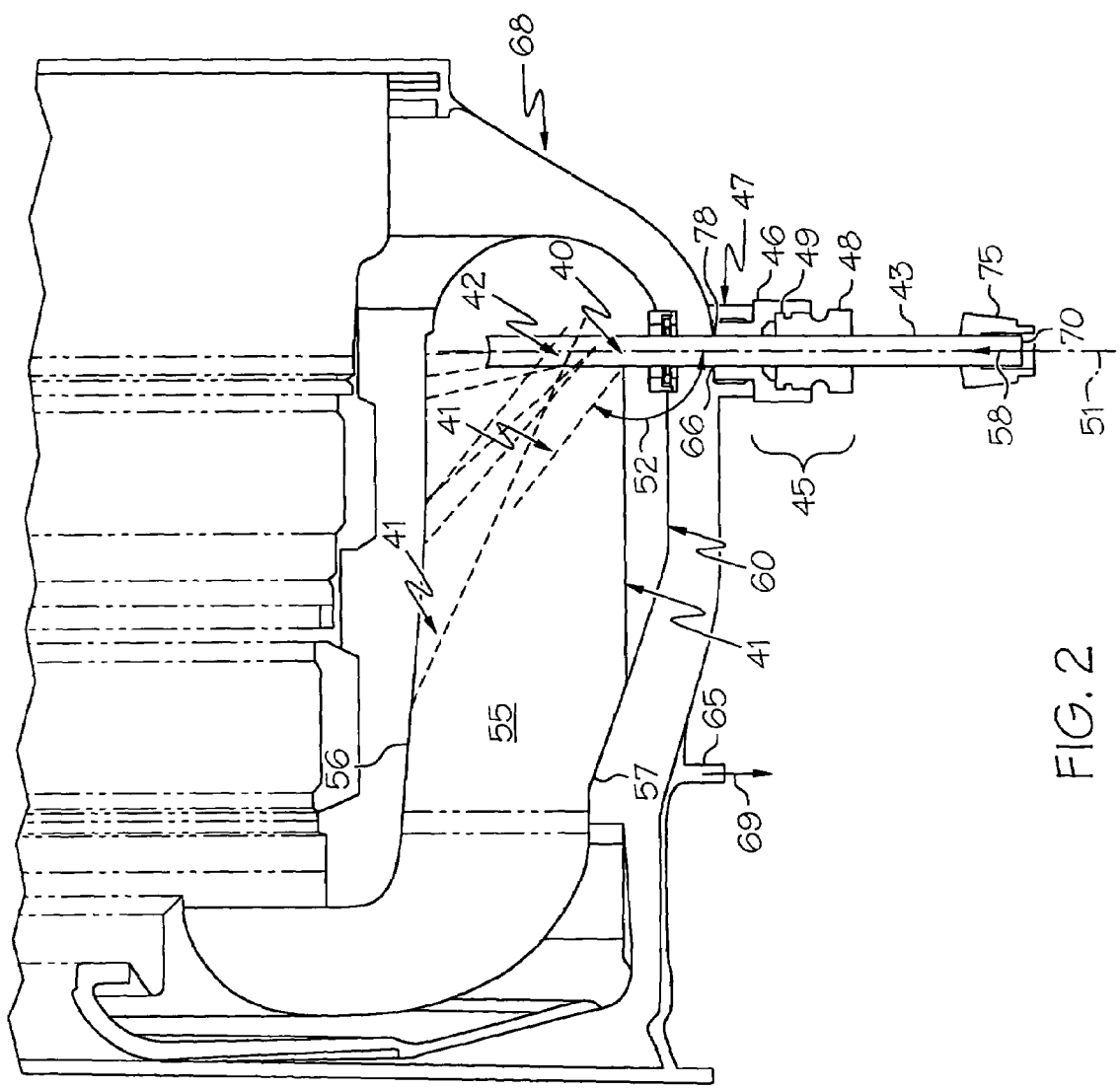
FIG. 2 is a cross-sectional view of a nozzle assembly comprising a fixed spray bar positioned in a combustor according to an embodiment of the present invention.

The component may comprise any turbine engine component. The component may comprise a chamber. For example, the component may comprise a combustor 60 having a combustion chamber 55, as depicted in FIG. 2. The chamber may be defined at least in part by one or more effusion panels, such as combustor liners. For example, the chamber may be defined in part by a combustor inner liner 56 and a combustor outer liner 57.

The step 31 of providing at least one nozzle assembly may comprise providing a nozzle assembly 40 having at least one spray portion 42 and an adapter portion 45, as depicted in FIG. 2. The spray portion 42 may be in contact with the adapter portion 45. The number of nozzle assemblies 40 may vary with application. For example, when the component comprises a combustor 60 having two igniter plug bosses 47, the step 31 may comprise providing two nozzle assemblies 40.

Figure 3:
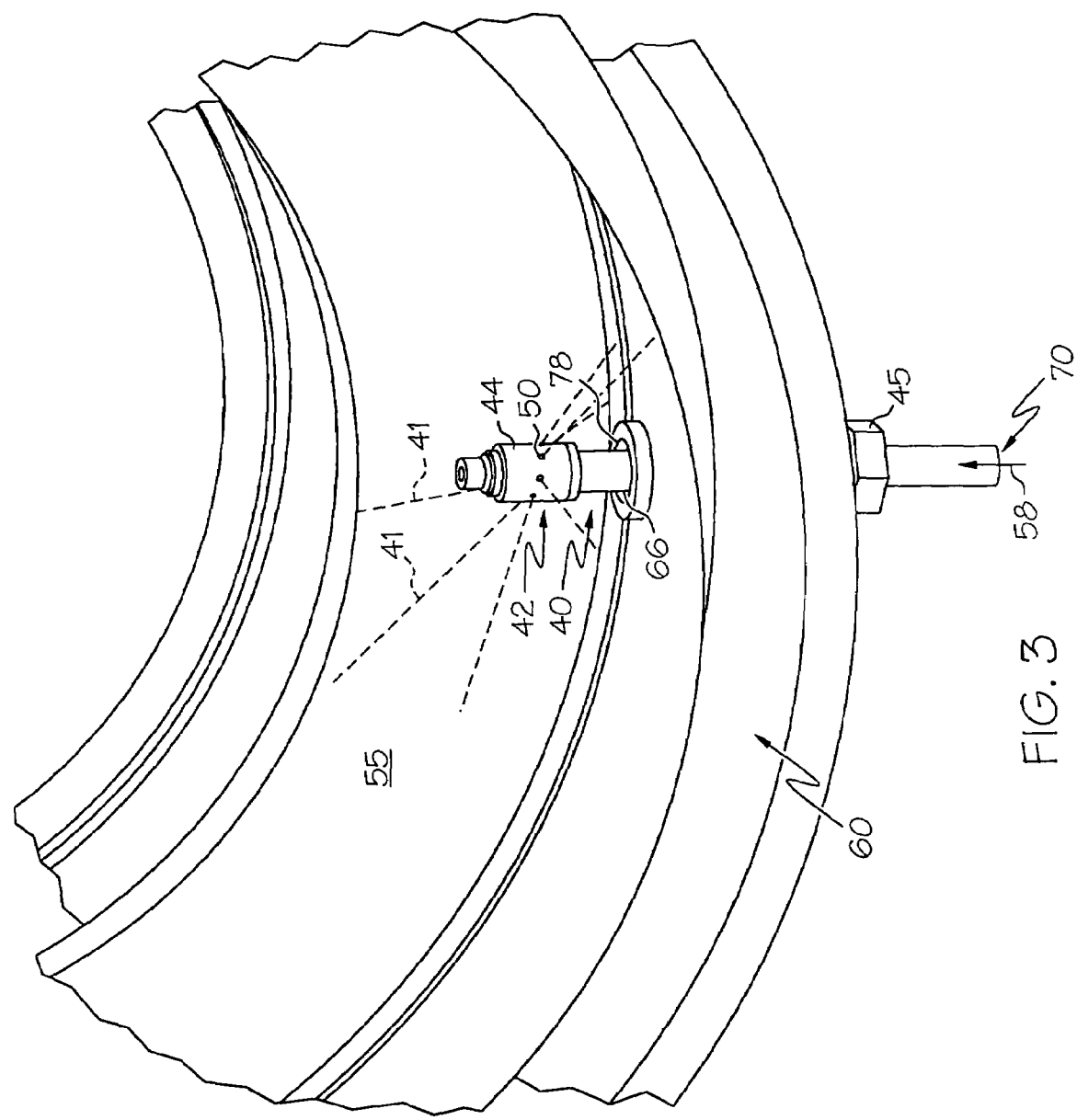
FIG. 3 is a perspective view of a rotating spray head positioned inside a combustion chamber according to one embodiment of the present invention.
Figure 4:
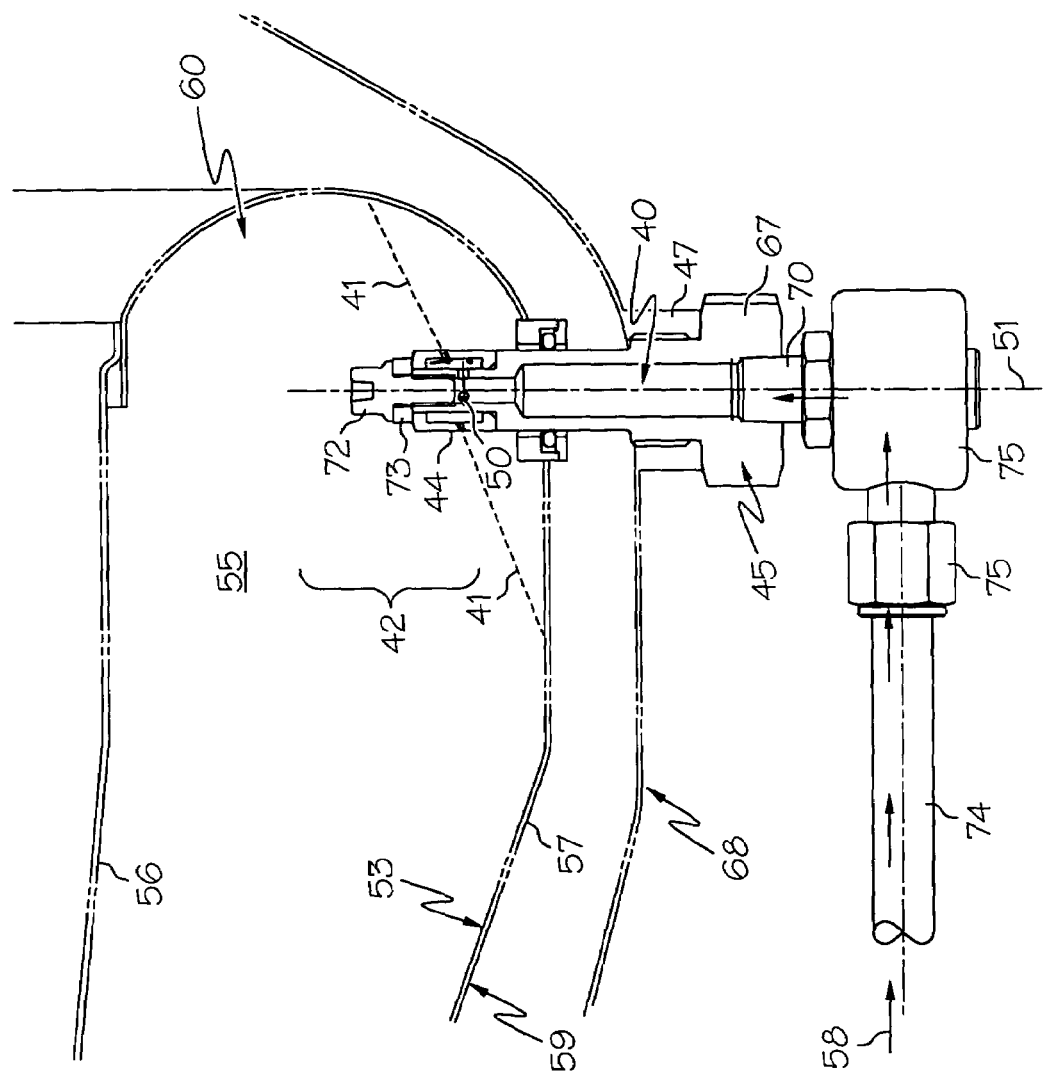
FIG. 4 is a cross-sectional view of a nozzle assembly comprising a rotating spray head positioned in a combustor according to an embodiment of the present invention.
Figure 5A:
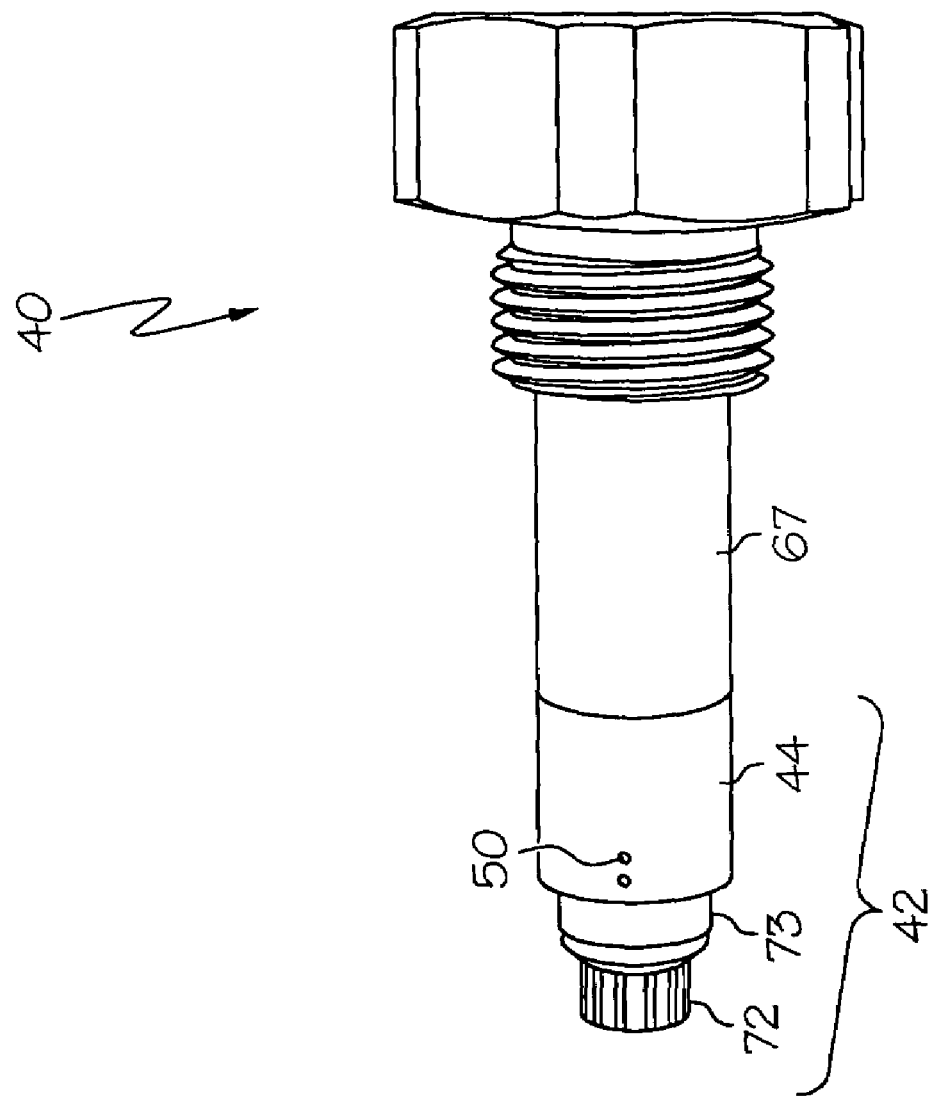
FIG. 5a is a perspective view of a nozzle assembly comprising a rotating spray head according to one embodiment of the present invention.
Figure 5B:
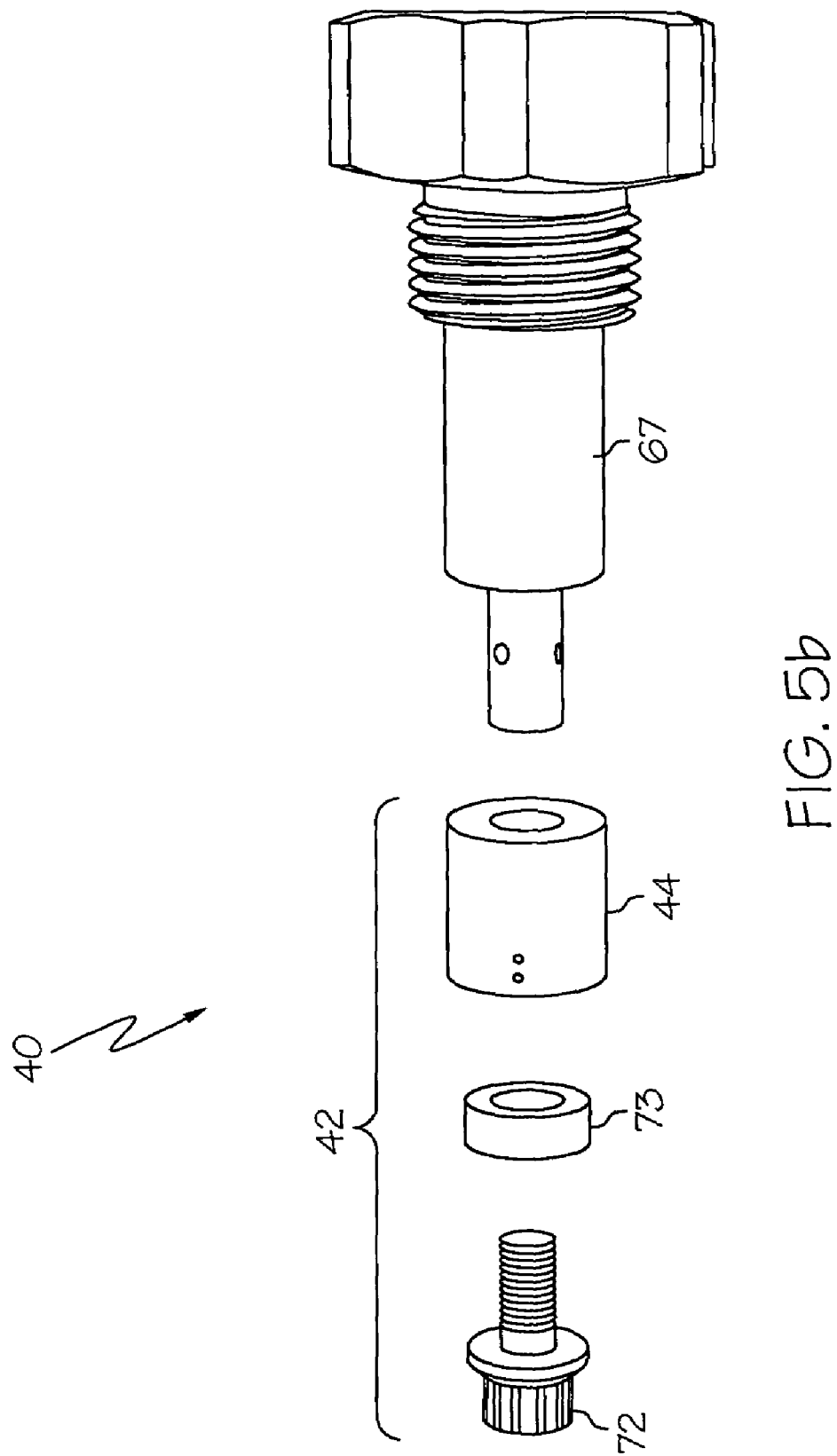
Figure 9:
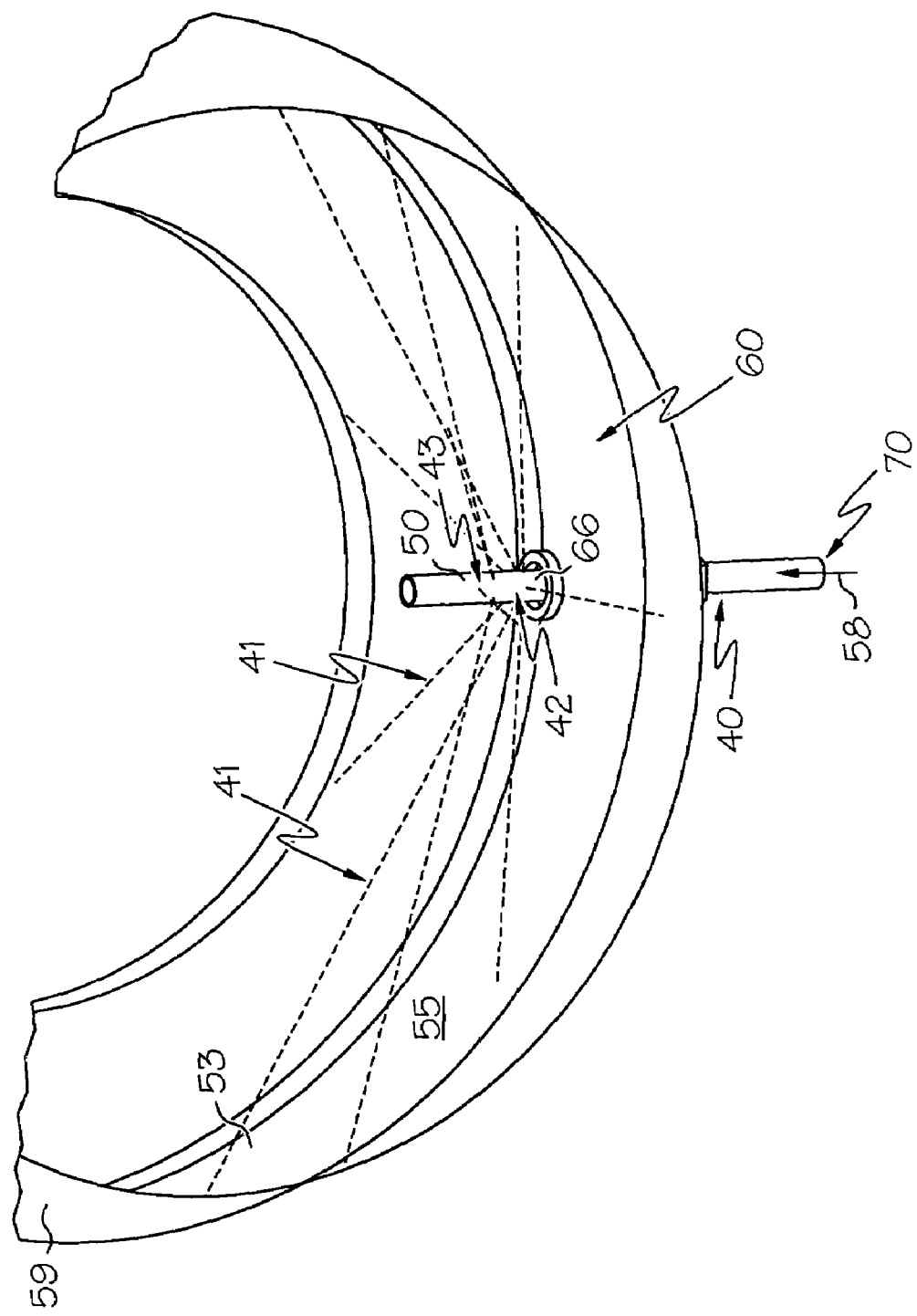
FIG. 9 is a perspective view of a spray portion positioned inside a combustion chamber according to one embodiment of the present invention.

The spray portion 42 of the nozzle assembly 40 may be capable of receiving a flow 58 and providing at least one fluid stream 41. For some applications, the spray portion 42 may comprise conventional spray apparatus. The spray portion 42 may comprise a fixed spray bar 43, as shown in FIG. 2. The fixed spray bar 43 may comprise a cylindrical member having at least one nozzle opening 50, as shown in FIG. 9. Alternatively, the spray portion 42 may comprise a rotating spray head 44, as depicted in FIGS. 3 and 4. The rotating spray head 44, better seen in FIGS. 5a and b, may comprise at least one nozzle opening 50. Rotating spray heads 44 are known in the art and may rotate in response to a flow through the nozzle assembly 40 due to the orientation of the nozzle openings 50. Although the spray portion 42 depicted in FIG. 5a comprises a bolt 72 and a washer 73, other spray portion configurations may be useful for some applications. The spray portion 42 may comprise a receiving aperture 70 and at least one nozzle opening 50, as depicted in FIGS. 3 and 4.

A receiving aperture 70 may be an opening capable of receiving the flow 58. The receiving aperture 70 may be in flow communication with at least one nozzle opening 50. The flow 58 may enter the receiving aperture 70 and pass through at least one nozzle opening 50 to provide at least one fluid stream 41. For a given volume of flow 58 through the receiving aperture 70, the volume of the fluid stream 41 may be inversely proportional to the number of nozzle openings 50 of the nozzle assembly 40.

The nozzle opening 50 may be an opening capable of providing the fluid stream 41. The diameter of the nozzle opening 50 may vary with application and may depend on factors including the dimensions of the component to be cleaned and the pressure of the flow 58. For example, for some annular combustor applications the diameter of the nozzle opening 50 may be between about 0.01 inches and about 0.05 inches. The number of nozzle openings 50 of the spray portion 42 may vary with application and may depend on factors including the pressure and velocity of the flow 58, the number of spray portions 42 of the nozzle assembly 40, and the dimensions of the component. For example, for a combustor 60 having a diameter 77 (shown in FIG. 6) of 15.53 inches, the spray portion 42 may have about 18 nozzle openings 50, each having a diameter of about 0.02 inches. Computational fluid dynamic (CFD) analysis may be useful in determining the desired number and diameter of the nozzle openings 50 for a particular application.

The nozzle opening 50 may be capable of providing the fluid stream 41 at an angle 52 relative to a nozzle centerline 51, as shown in FIG. 2. The angle 52 may have radial, axial, and tangential components with respect to the nozzle centerline 51 and the interface between the nozzle assembly 40 and an igniter plug boss 47. Each nozzle opening 50 of the spray portion 42 may provide a fluid stream 41 at a different angle 52. By varying the angle 52, a larger portion of the component surface may be impinged by the fluid streams 41. For some applications, the spray portions 42 may distribute the fluid streams 41 axially, radially, and circumferentially over an entire combustor. CFD analysis may be useful in determining the desired angle 52 of the nozzle openings 50 for a particular application.

The adapter portion 45 of the nozzle assembly 40 may be capable of holding the nozzle assembly 40 in position with respect to the component. The adapter portion 45 may comprise any apparatus capable of holding the nozzle assembly 40 in position during component cleaning. The adapter portion 45 may be capable of releasably coupling the nozzle assembly 40 to an engine component. In other words, the nozzle assembly 40 may be attached to an engine component during component cleaning and removed during normal engine operation. Adapter portions 45 are known in the art and may include spindles, fittings and o-rings. For example, when the nozzle assembly 40 is positioned in the APU igniter plug boss 47, the adapter portion 45 may comprise a first fitting 46 in contact with the igniter plug boss 47, a second fitting 48 in contact with the first fitting 46 and an o-ring 49 in contact with and between the first and second fittings, 46 and 48, as depicted in FIG. 2. Alternatively, the adapter portion 45 may comprise a spindle 67 in contact with the igniter plug boss 47, as depicted in FIG. 4. The spindle 67, better seen in FIGS. 5a and b, may be adapted to accommodate at least one rotating spray head 44. The adapter portion 45 may vary with application and may depend on the configuration of the component, the configuration of the nozzle application point and manufacturing limitations.

Figure 6:
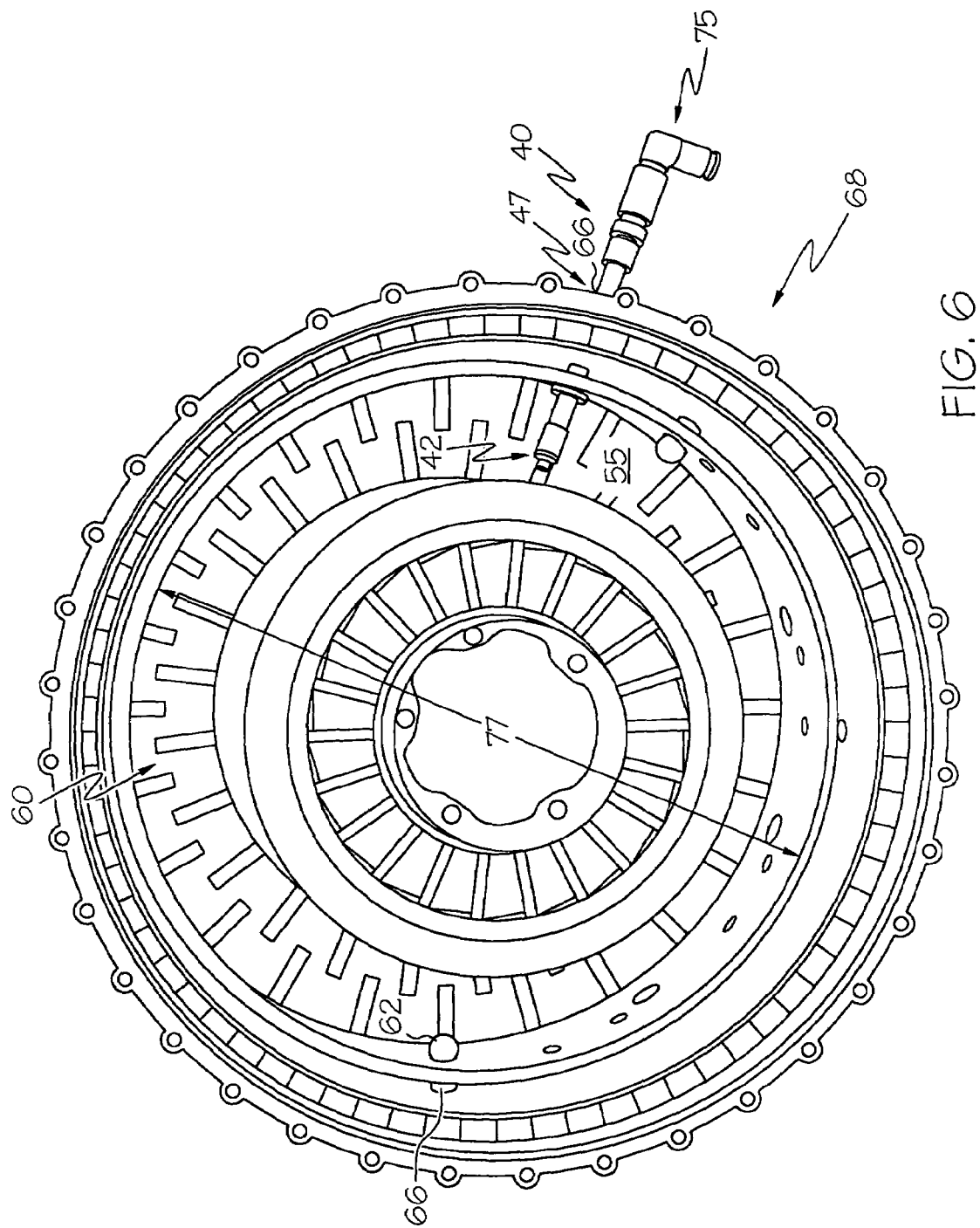
FIG. 6 is a perspective view of a combustor with a nozzle assembly in position according to one embodiment of the present invention.
Figure 7:
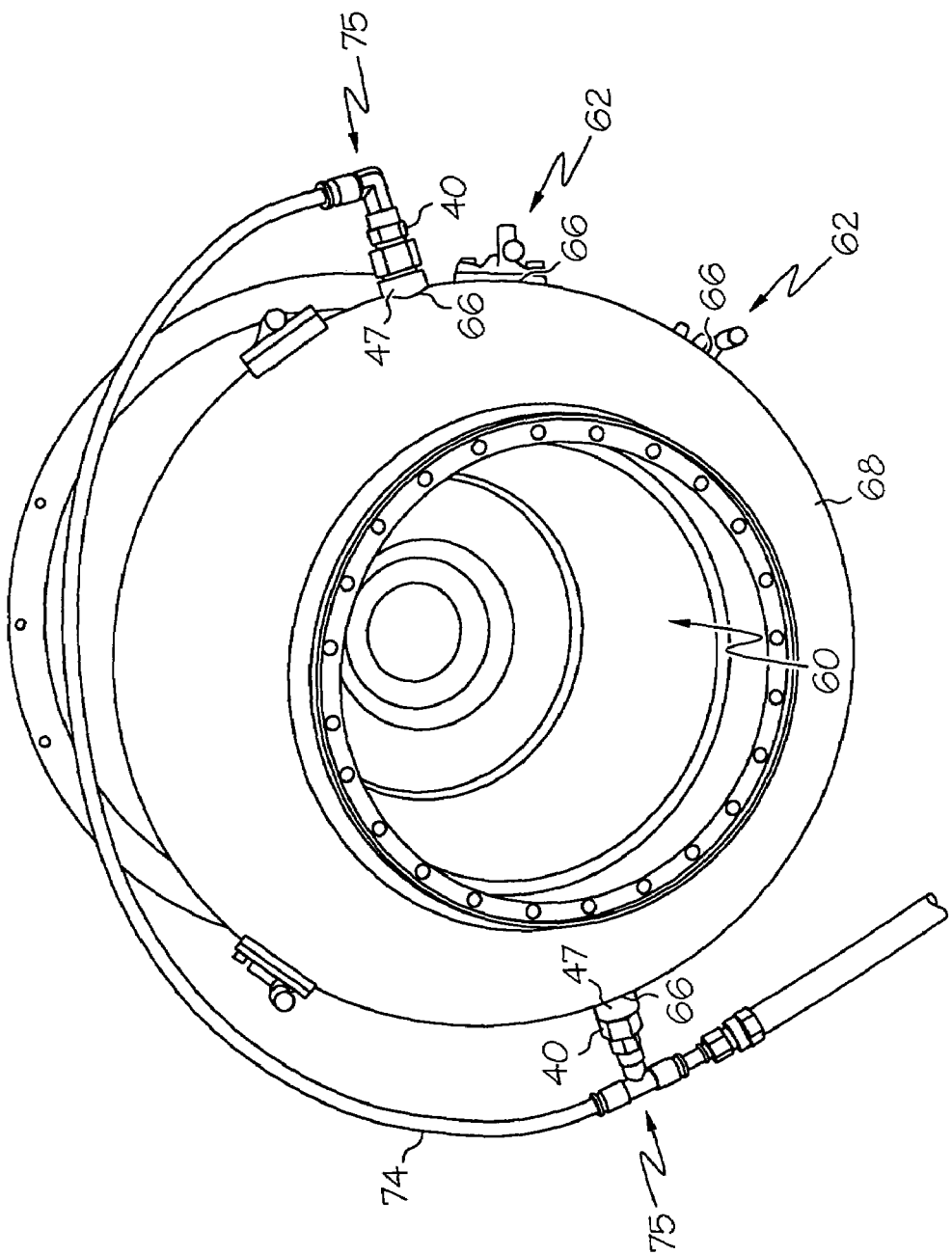
FIG. 7 is a perspective view of a combustor with nozzle/tubing couplers and tubing in position according to one embodiment of the present invention.
Figure 8:
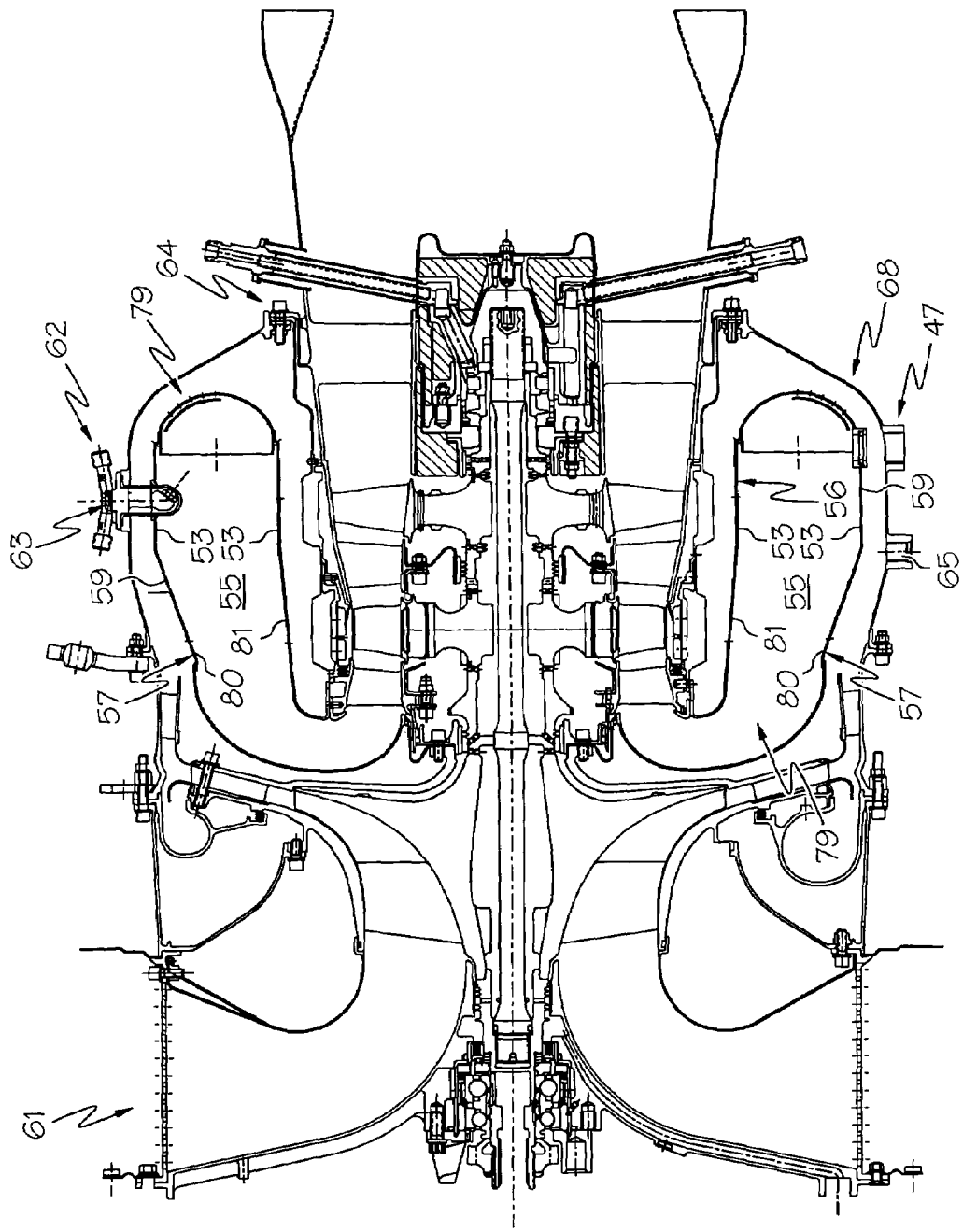
FIG. 8 is a cross-sectional view of an annular combustor and nozzle application points according to an embodiment of the present invention.

A nozzle application point 66, as depicted in FIG. 3, may comprise an opening through which the spray portion 42 of the nozzle assembly 40 may be passed. The nozzle application point 66 may comprise an opening 78 capable of being in contact with the adapter portion 45 of the nozzle assembly 40, as shown in FIG. 2. The nozzle application point 66 may be a generic term and may comprise the igniter plug boss 47, as depicted in FIGS. 2 and 6. When the nozzle application point 66 comprises the igniter plug boss 47, the nozzle assembly 40 may be positioned such that the nozzle assembly 40 extends through a combustor case 68 and the spray portion 42 of the nozzle assembly 40 is positioned within a combustion chamber 55. The nozzle application point 66 may be located at a fuel nozzle 62, as depicted in FIGS. 6 and 7. The nozzle application point 66 may vary and may depend on the configuration of the component and the accessibility of the opening. For example, the nozzle application point 66 for an annular combustor application may comprise the igniter plug boss 47. Nozzle application points 66 may be provided by modifying and/or removing existing structures, such as a fuel atomizer bolt 63, a fuel nozzle 62, a turbine housing bolt 64, a combustor housing drain 65, and an APU inlet 61, as depicted in FIG. 8.

Figure 10:
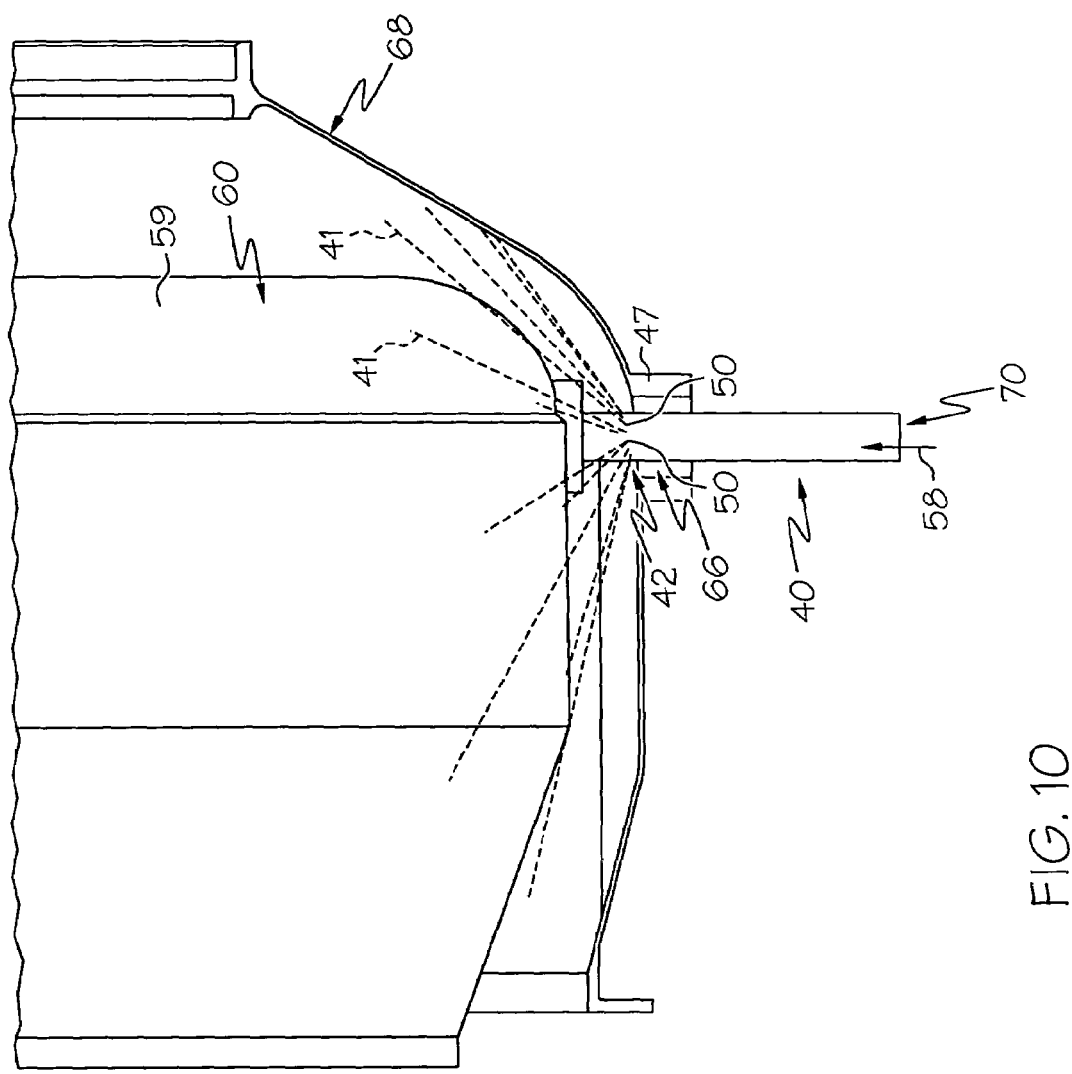
FIG. 10 is a perspective view of a spray portion positioned outside a combustion chamber according to an embodiment of the present invention.
Figure 11:
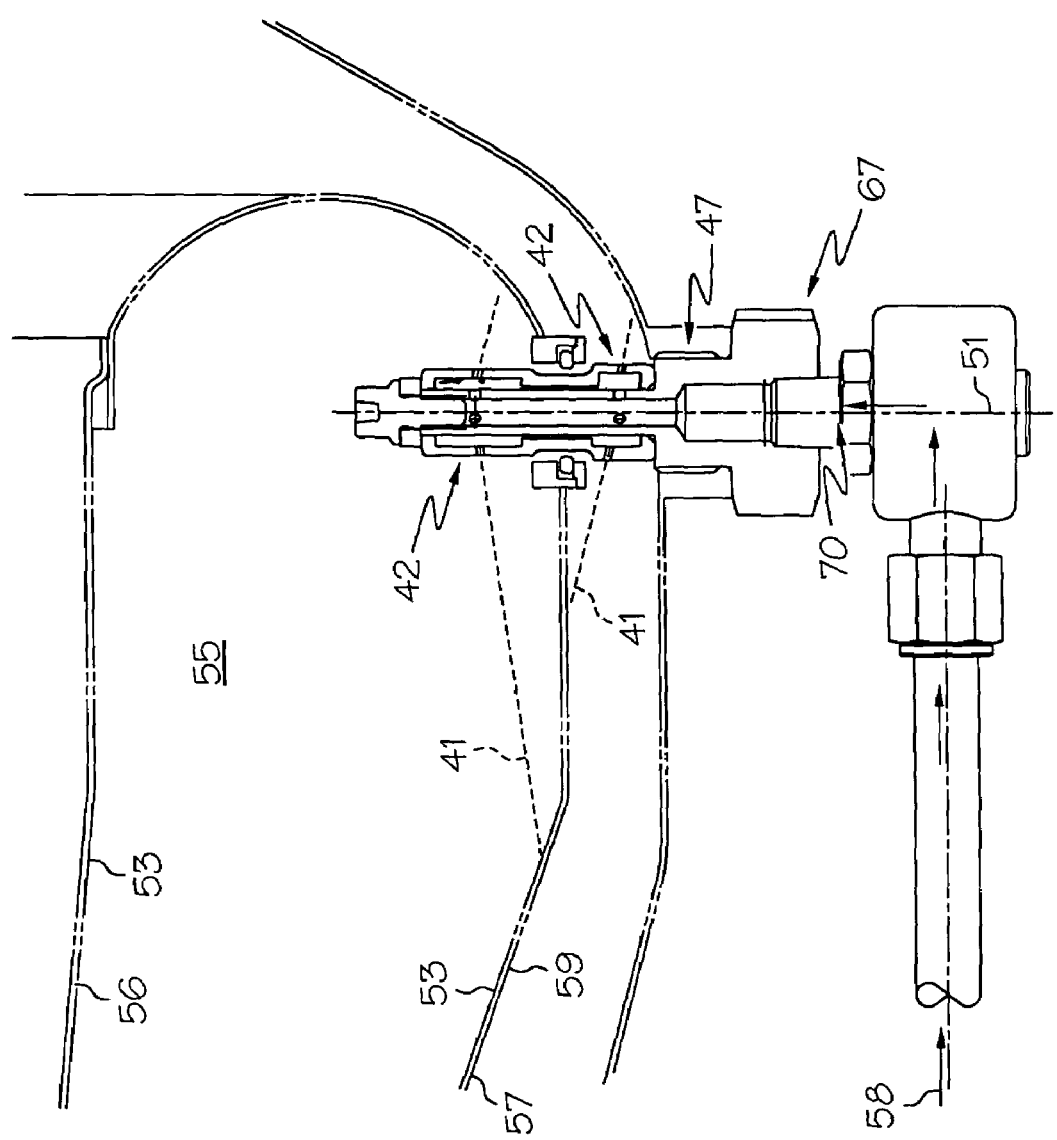
FIG. 11 is a perspective view of nozzle assembly having a first spray portion positioned inside a combustion chamber and a second spray portion positioned outside the combustion chamber according to one embodiment of the present invention.

The step 32 of positioning the spray portion 42 may comprise inserting the spray portion 42 through the nozzle application point 66. The spray portion 42 may be positioned such that a fluid stream 41 from the nozzle assembly 40 is capable of impinging a surface of the component. When the spray portion 42 is positioned within a component chamber, such as a combustion chamber 55, the fluid streams 41 may impinge an interior surface 53 of the component, as depicted in FIG. 9. When the spray portion 42 is positioned outside the component, the fluid streams 41 may impinge an exterior surface 59 of the component, as depicted in FIG. 10. For nozzle assemblies 40 comprising more than one spray portion 42, one spray portion 42 may be positioned within a component chamber and another spray portion may be positioned outside the component, as depicted in FIG. 11. Nozzle assemblies 40 comprising more than one spray portion 42 may provide a plurality fluid streams 41 that impinge an interior surface 53 of the component and a plurality fluid streams 41 that impinge an exterior surface 59 of the component. Interior surface 53 and exterior surface 59 may be defined with reference to a component chamber, such as combustion chamber 55. For example, exterior surface 59 of an annular combustor 79, depicted in FIG. 8, may include a radially outward surface of an outer liner 57. Exterior surface 59 may include a radially inward surface of an inner liner 56. An interior surface 53 of an annular combustor 79 may include a radially inward surface 80 of an outer liner 57 and a radially outward surface 81 of an inner liner 56.

The step 33 of positioning the adapter portion 45 may comprise placing the adapter portion 45 in contact with the nozzle application point 66 and manually rotating the first fitting 46 and/or second fitting 48. The step 33 may comprise inserting a spindle 67 in the nozzle application point 66. The step 33 may comprise removably attaching the adapter portion 45 to the nozzle application point 66, such as igniter plug boss 47. The step 33 may result in the spray portion 42 being held in position relative to the combustor 60. The step 33 may vary with application and may depend on the configuration of the nozzle application point 66 and the configuration of the adapter portion 45.

The step 34 of providing a flow 58 to the nozzle assembly 40 may comprise pumping a fluid into the nozzle assembly 40. Methods of providing a flow 58 may comprise conventional pumping techniques. Methods of providing a flow 58 may comprise a length of tubing 74, a nozzle/tubing coupler 75, and a pump (not shown), depicted in FIG. 7. The pump may force the flow 58 through the length of tubing 74 from a container (not shown) to the nozzle assembly 40. The nozzle/tubing coupler 75 may couple the tubing 74 to the nozzle assembly 40. The pressure and flow rate of the flow 58 may vary with application. The pressure and flow rate of the flow 58 may depend on factors including the dimensions of the component and the diameter of the nozzle openings 50. For example, for an annular combustor application, the flow 58 may be provided at about ½ gallon per minute and about 60 psi. For some applications, the flow 58 may be provided at a flow rate between about ½ gallon per minute and about 30 gallons per minute. For some applications, the flow 58 may be provided at a pressure between about 10 psi and about 250 psi. The volume of the flow 58 provided may vary with application and may depend on the dimensions and configuration of the component and the composition of the flow 58. The composition of the flow 58 may be selected such that the flow 58 does not attack the metal and/or thermal barrier coating (TBC) of the component. For example, for an annular combustor 79 of an APU, the flow 58 may comprise about 24 gallons of 5% acetic acid solution.

For some applications, the nozzle assembly 40 may be manually rotated during the step 34. For example, when the spray portion 42 comprises a fixed spray bar 43, the fixed spray bar 43 may be rotated by hand while the flow 58 is pumped through the nozzle assembly 40. The rotation of the spray portion 42 may improve the distribution of the fluid streams 41. For some applications, the spray portion 42 may comprise a rotating spray head 44 and manual rotation may be unnecessary.

The method 30 may comprise at least one step 34 of providing a flow 58. The method 30 may comprise more than one step 34. For example, the method 30 may comprise a first step 34 wherein the flow 58 comprises 5% acetic acid solution and a second step 34 wherein the flow 58 comprises distilled water. In this example, the first step 34 may dissolve a contaminant deposited on the component surface and the second step 34 may remove an acid solution residue left on the component surface by the first step 34.

The method 30 may comprise more than one step 34 with a wait period or dwell time between the successive steps 34. For example, the method 30 may comprise a step 34 wherein the flow 58 comprises 5% acetic acid solution followed by a waiting period of ten minutes and then another step 34 wherein the flow 58 comprises 5% acetic acid solution. In this example, the dwell time may be provided to allow additional time for the acid solution to react with the contaminant deposit 76. For some applications, the contaminant deposit 76 may not be sufficiently removed by one acid wash step and more than one acid wash step may be useful. The number of steps 34 may vary with application and may depend on factors including the composition of the flow 58 and the composition and mass of the contaminant deposit 76.

Figure 12B:
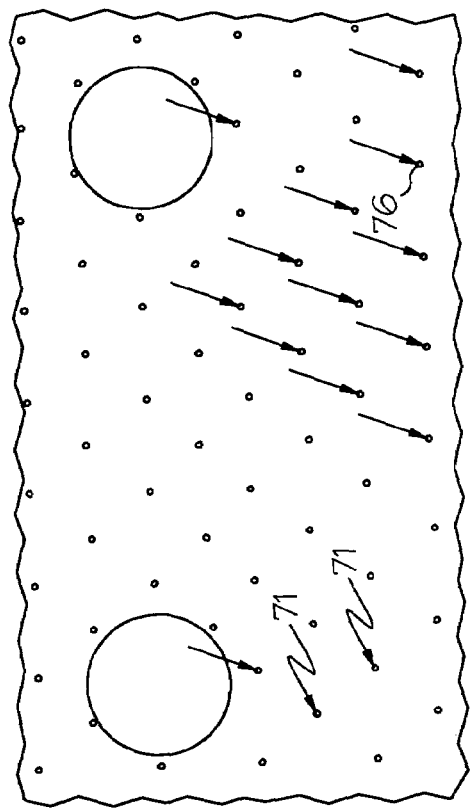

The method 30 may comprise a step 34 of providing a flow 58 wherein the flow 58 comprises a recirculating flow. For a recirculating flow, an effluent 69 may be collected, filtered and provided to the receiving aperture 70. For some recirculating flows, the effluent may be collected and provided to the receiving aperture 70 without filtering. The effluent 69 may comprise a cleaning solution or rinse water that has been sprayed through the nozzle assembly 40 and then drained from the component. After the fluid streams 41 impinge a surface of the component, they may provide an effluent 69, as depicted in FIG. 2. For example, a spray portion 42 positioned inside a combustion chamber 55 may provide a plurality of fluid streams 41 that impinge an interior surface 53 of a combustor 60. After impinging the interior surface 53, the fluid streams 41 may exit the combustion chamber 55 though the effusion holes 71 (shown in FIG. 12b) of the outer liner 57 and pass through the combustor housing drain 65 to provide an effluent 69. The effluent 69 may be collected, filtered, and returned the nozzle assembly 40 by known techniques. Methods for collecting, filtering and returning the effluent 69 may comprise providing a length of tubing and a filter apparatus between and in flow communication with the combustor housing drain 65 and the receiving aperture 70.

The flow 58 of step 34 may comprise a cleaning flow or a rinse flow. The cleaning flow may be any flow 58 that is capable of cleaning the component. The cleaning flow may be capable of dissolving a contaminant deposit 76, shown in FIG. 12b. The cleaning flow may be capable of dissolving environmental contaminants, such as Si, O, and S. Useful cleaning flows may comprise an acidic solution having a pH between about 2.0 and about 3.0. Useful cleaning flows may include acetic acid, phosphoric acid, citric acid, and others. For some applications, the cleaning flow may comprise an acetic acid solution with a pH between about 2.0 and about 3.0. For some applications, the cleaning flow may comprise a solution with a pKa of about 4.76. The cleaning flow may comprise an additive such as a surfactant or a wetting agent. The cleaning flow may comprise one or more additives. Conventional surfactants and wetting agents may improve component cleaning by reducing the surface tension of the flow 58, which may provide improved contact between the flow 58 and the contaminant deposit 76. The composition of the cleaning flow may vary with application and may depend on the composition of the component and the composition of the contaminant deposit 76. The cleaning flow may comprise any fluid capable of removing contaminant deposits 76 from effusion holes 71 without attacking the metal of the component. For example, the cleaning flow may comprise 5% acetic acid. For some applications, the cleaning flow may comprise between about 0% and about 25% acetic acid. For some applications, the cleaning flow may comprise between about 1% and about 10% acetic acid. For some applications, the cleaning flow may comprise between about 3% and about 5% acetic acid. Some cleaning flows may leave a cleaning flow residue on the component. The flow 58 may comprise a rinse flow capable of removing the cleaning flow residue from the component. The rinse flow may be any flow 58 that is capable of rinsing the component. The rinse flow may comprise water, such as distilled water and deionized water.

EXAMPLE 1

Figure 12A:
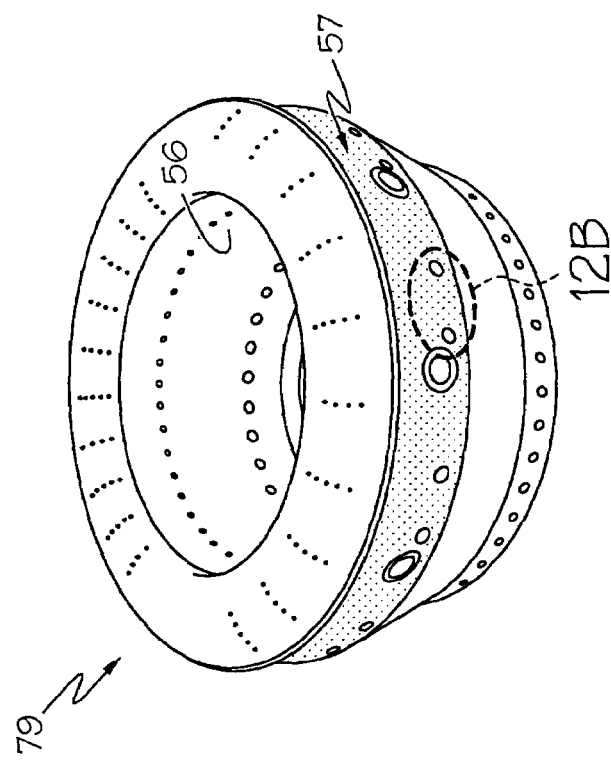
FIG. 12a is a perspective view of an annular combustor with plugged effusion holes according to one embodiment of the present invention.
Figure 14:
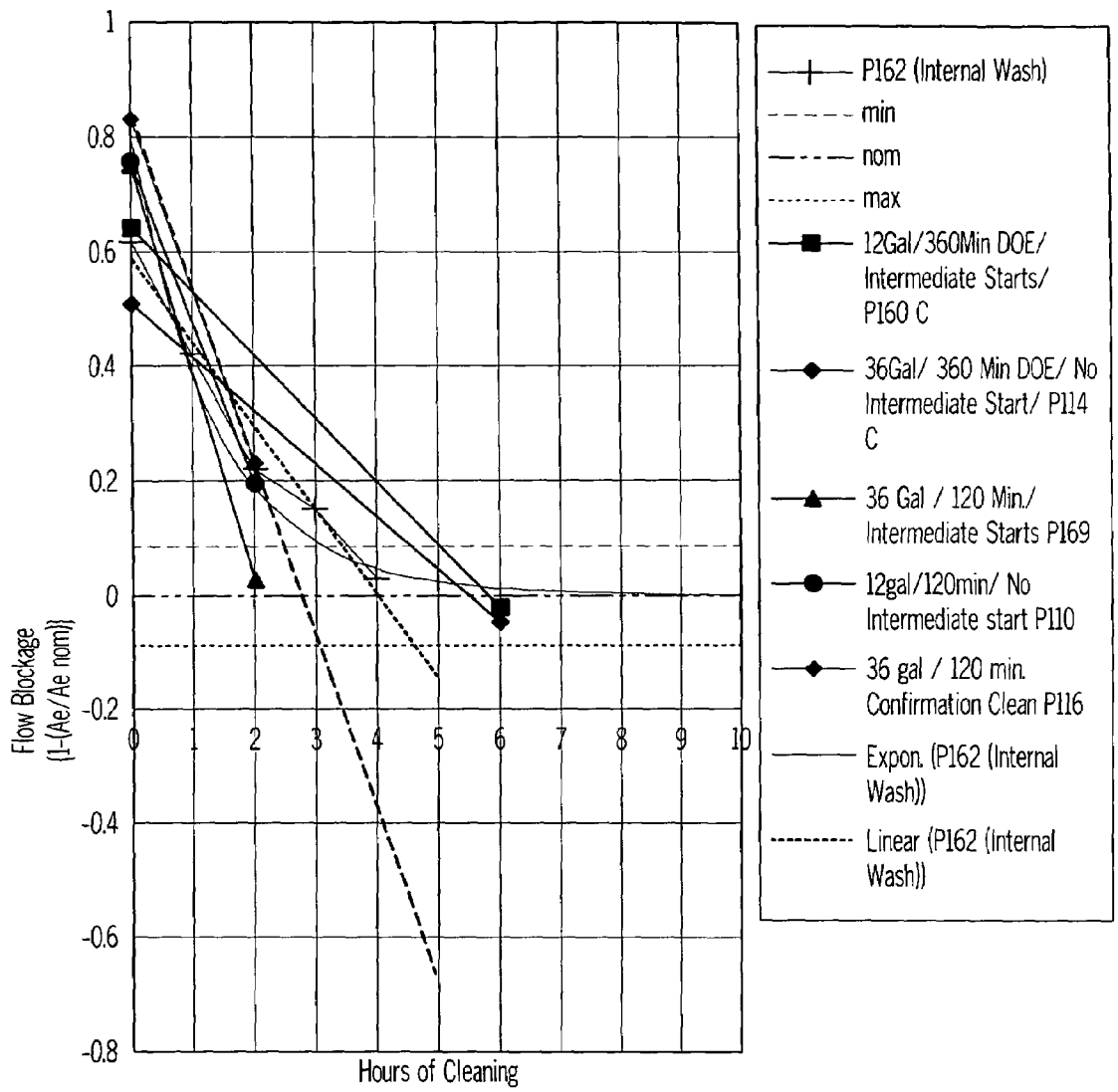
FIG. 14 is a graph depicting airflow blockage vs. hours of cleaning according to one embodiment of the present invention.

An annular combustor having two igniter plug bosses was provided, as shown in FIGS. 12a and b. The combustor was about 65 percent plugged. Several completely plugged effusion holes (indicated by arrows in FIG. 12b) were circled for later observation. A nozzle assembly comprising a fixed spray bar was inserted into the first igniter plug boss, as shown in FIG. 2. The nozzle assembly was held in position by an adapter portion comprising two fittings and an o-ring. The receiving aperture of the nozzle assembly was attached to a quick disconnect fluid fitting elbow. The spray portion of the nozzle assembly was manually rotated while ½ gallon of 5% acetic acid was pumped through the nozzle at 60 psi using a pump assembly with a minimum flow rate of ½ GPM. The nozzle assembly was removed from the first igniter plug boss and positioned in the second igniter plug boss. The nozzle was manually rotated while another ½ gallon of 5% acetic acid was pumped through the nozzle at 60 psi using a pump assembly with a minimum flow rate of ½ GPM. This was followed by a ten minute wait period. The pumping and wait period were repeated six times to deliver a total of six gallons of acetic acid solution and complete the first wash cycle. The nozzle and pump assembly was then used to deliver 6 gallons of distilled water in the same manner to complete the first rinse cycle. The wash and rinse cycles were then repeated to deliver another 6 gallons of acetic acid solution and 6 gallons of distilled water. The APU was operated and cooled. The wash and rinse cycles were repeated twice to deliver another 12 gallons of acetic acid solution and 12 gallons of distilled water. The total cleaner volume was 24 gallons and the total soak time was 240 minutes for this example. Combustor cold flow verification confirmed improved flow through the combustor. The flow data is shown in FIG. 13. The table shows the airflow improvement with respect to total cleaner volume and total soak time. As can be seen, other cleaner volumes and soak times also resulted in reduced blockage. The graph in FIG. 14 shows the airflow improvement with respect to hours of cleaning. For some applications, the time required to perform the cleaning procedure may be reduced by reducing the number of intermediate rinse cycles and/or rinse volume.

As can be appreciated by those skilled in the art, the present invention allows aircraft operators and maintenance facilities to remove the blockage within combustor effusion cooling holes at specific maintenance intervals without removing the engine from the aircraft. This regular cleaning schedule may eliminate the possibility of experiencing uncommanded engine shutdowns that result from reduced lean blowout margin due to blocked combustor effusion cooling holes, or wall distress due to reduced cooling effectiveness.

It should be understood, of course, that the foregoing relates to exemplary embodiments of the invention and that modifications may be made without departing from the spirit and scope of the invention as set forth in the following claims.

We claim:

1. A method of cleaning a combustor of a gas turbine engine, comprising the steps of:
    inserting at least part of at least one nozzle assembly into an interior of said combustor when said combustor is mounted within said gas turbine engine, wherein said inserting step further comprises inserting said at least one part of said at least one nozzle assembly through an igniter plug boss of said combustor; and
    spraying a fluid through said at least one nozzle assembly and towards at least one surface of said combustor, said nozzle assembly held in position relative to said combustor by an adapter portion of said nozzle assembly.

2. The method of claim 1, wherein said fluid comprises a cleaning fluid.

3. The method of claim 1, wherein said fluid comprises a recirculating fluid.

4. The method of claim 1, wherein said combustor comprises an annular combustor.

5. The method of claim 1, wherein said step of spraying comprises spraying towards an interior surface of said combustor.

6. The method of claim 1, wherein said nozzle assembly comprises a first spray portion and a second spray portion.

7. The method of claim 1, wherein said fluid comprises an acetic acid solution with a pH between about 2.0 and about 3.0.

8. The method of claim 2, further comprising a step of spraying a rinse fluid through said nozzle assembly and towards said surface of said combustor.

9. The method of claim 6, wherein said step of spraying comprises spraying a first portion of said fluid through said first spray portion and towards an interior surface of said combustor and spraying a second portion of said fluid through said second spray portion and towards an exterior surface of said combustor.

10. A method of cleaning an on-wing combustor of a gas turbine engine, the combustor having an interior surface and an exterior surface with a nozzle assembly having a first spray portion and a second spray portion, comprising the steps of:
    inserting said first spray portion of said nozzle assembly through an igniter plug boss of said combustor and into an interior portion of said combustor when said on-wing combustor is mounted within said gas turbine engine; and
    spraying a cleaning fluid through said nozzle assembly such that a first portion of said cleaning fluid passes through said first spray portion of said nozzle assembly and towards said interior surface and a second portion of said cleaning fluid passes through said second spray portion of said nozzle assembly and towards said exterior surface.

11. The method of claim 10, further comprising a step of spraying a rinse fluid through said nozzle assembly such that a first portion of said rinse fluid passes through said first spray portion and towards said interior surface and a second portion of said rinse fluid passes through said second spray portion and towards said exterior surface.

12. The method of claim 10, wherein said step of spraying a cleaning fluid produces an effluent, and wherein said effluent is collected, filtered and returned to and sprayed through said nozzle assembly.

13. The method of claim 10, wherein said step of spraying a cleaning fluid comprises pumping a cleaning fluid through a receiving aperture of said nozzle assembly.

14. The method of claim 10, wherein said first spray portion comprises a rotating spray head.

15. The method of claim 10, wherein said second spray portion comprises a rotating spray head.

16. The method of claim 10, wherein said nozzle assembly comprises a plurality of nozzle openings, each nozzle opening having a diameter between about 0.01 inches and about 0.05 inches.

17. The method of claim 13, wherein said pumping is at a flow rate between about 1 gallon per minute and about 30 gallons per minute.

18. The method of claim 13, wherein said pumping is at a pressure between about 10 psi and about 250 psi.

19. A method of cleaning a combustor in a gas turbine engine having at least one igniter plug boss comprising the steps of:
    inserting a spray portion of a nozzle assembly through said igniter plug boss of the combustor in the gas turbine engine; and
    pumping a cleaning fluid through said nozzle assembly such that at least one fluid stream impinges an interior surface of said combustor.

20. The method of claim 19, wherein said step of pumping a cleaning fluid comprises pumping an acetic acid solution.

21. The method of claim 19, wherein said cleaning fluid has a pH between about 2.0 and about 3.0.

22. A method of cleaning an annular combustor with a nozzle assembly having a first rotating spray head and a second rotating spray head, the annular combustor forming part of a gas turbine engine of an aircraft, the method comprising the steps of:

inserting the first rotating spray head through an igniter plug boss and into the annular combustor when the combustor is mounted within said gas turbine engine of said aircraft; and pumping an acid solution through said nozzle assembly such that a first portion of said acid solution passes through said first rotating spray head of said nozzle assembly and towards an interior surface of said annular combustor and a second portion of said acid solution passes through said second rotating spray head of said nozzle assembly and towards an exterior surface of said annular combustor.

23. The method of claim 22, wherein said acid solution comprises acetic acid.

24. The method of claim 22, wherein said pumping is at a pressure between about 10 psi and about 250 psi.

25. The method of claim 22, wherein said acid solution is a recirculating acid solution.

26. The method of claim 22, wherein said acid solution has a pH between about 2.0 and about 3.0.

27. A method of removing a contaminant deposit from an effusion hole of an on-wing combustor of a gas turbine aircraft engine, the method comprising the steps of:

inserting at least one nozzle assembly through an igniter plug boss of said on-wing combustor;

pumping a recirculating fluid through at least one nozzle assembly, said recirculating fluid comprises acetic acid, said nozzle assembly having a first rotating spray head, a second rotating spray head and an adapter portion, wherein a first portion of said recirculating fluid passes through said first rotating spray head and impinges an interior surface of said on-wing combustor mounted within said gas turbine aircraft engine and a second portion of said recirculating fluid passes through said second rotating spray head and impinges an exterior surface of said on-wing combustor, thereby removing said contaminant deposit; and pumping a rinse fluid comprising distilled water through said nozzle assembly.

* * * * *